Sept. 22, 1925.
W. H. CARRIER
HUMIDITY REGULATOR
Original Filed Aug. 6, 1908  2 Sheets-Sheet 1
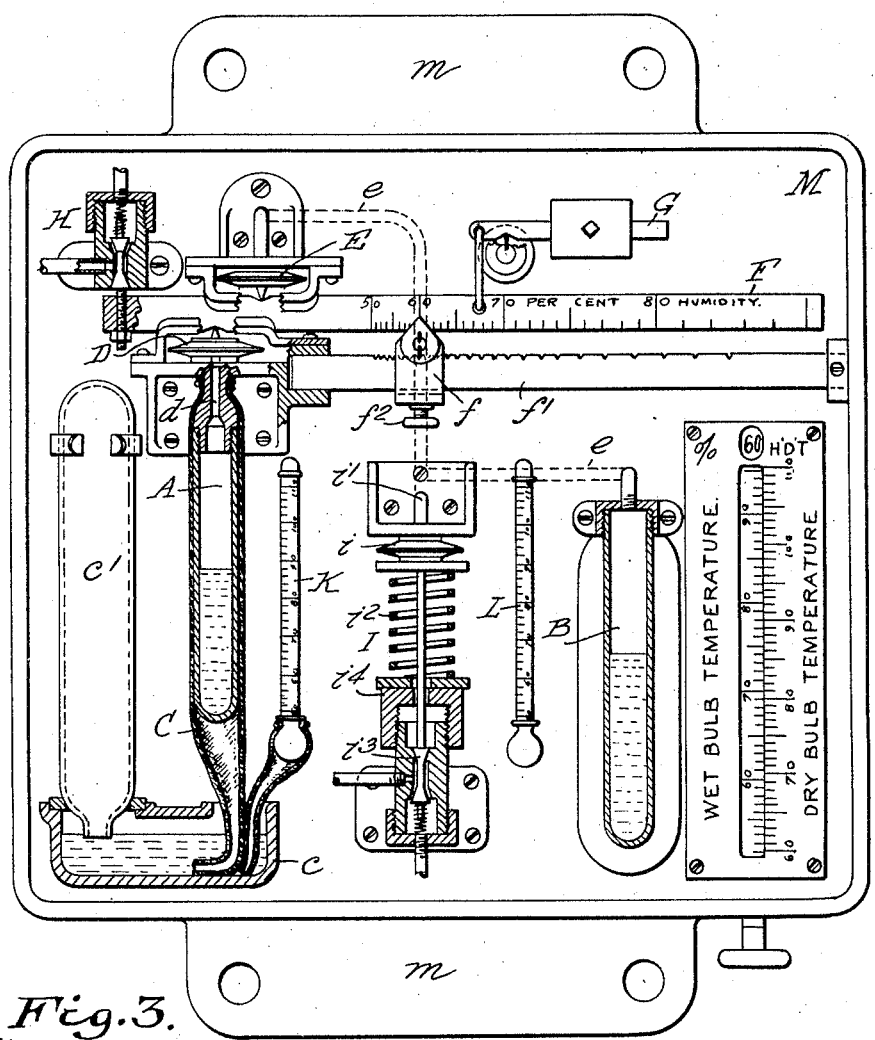
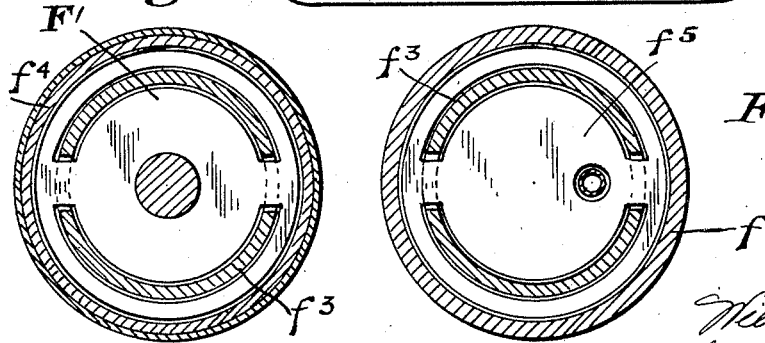
INVENTOR.
Willis H. Carrier
by Parker & Rockwood
ATTORNEYS.

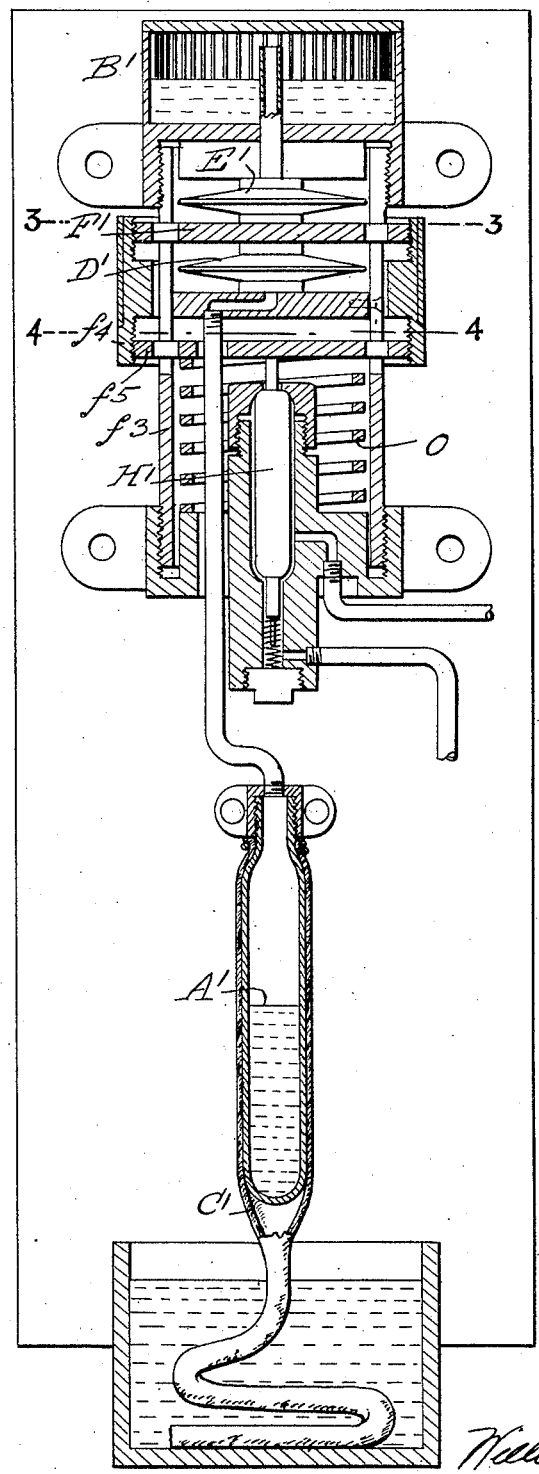

Patented Sept. 22, 1925.

1,554,785

UNITED STATES PATENT OFFICE.

WILLIS H. CARRIER, OF ESSEX FELLS, NEW JERSEY, ASSIGNOR TO BUFFALO FORGE COMPANY, OF BUFFALO, NEW YORK.

HUMIDITY REGULATOR.

Original application filed August 6, 1908, Serial No. 447,240. Divided and this application filed March 8, 1922. Serial No. 542,028.

*To all whom it may concern:*

Be it known that I, WILLIS H. CARRIER, a citizen of the United States, residing at Essex Fells, in the county of Essex and State of New Jersey, have invented a new and useful Improvement in Humidity Regulators, of which the following is a specification.

This invention relates to automatic regulating devices for controlling the humidity and temperature of air in textile mills and other places where definite conditions of humidity are essential or desirable, this application being a division of my application for United States Letters Patent, Serial No. 447,240, filed August 6, 1908.

One object of the invention is to produce an efficient and practical instrument in which the pressure of the vapor generated by a volatile liquid is made use of for controlling the humidity of the air, and particularly to construct the regulating instrument so that the vapor pressures of two thermoresponsive elements which are independently affected by temperature changes, act in opposition to each other on the valve or device which controls the humidity. Other objects of the invention are to make the instrument adjustable for obtaining the different desired hygrometric conditions of the air; also to provide an instrument adapted to be readily adjusted to give different desired humidities in accordance with one or another predetermined difference between the wet and dry bulb temperatures of the air affecting the thermoresponsive elements of the instrument; and also to improve regulating instruments of the character mentioned in the respects hereinafter described and set forth in the claims.

In the accompanying drawings:

Fig. 1 is a front elevation of a humidity and temperature regulating device embodying the invention, as particularly claimed in my said original application No. 447,240, the cover for the support being removed.

Fig. 2 is a sectional elevation of a modification which forms the subject-matter claimed in this divisional application.

Fig. 3 is a horizontal section on line 3—3, Fig. 2. Fig. 4 is a similar view on line 4—4 Fig. 2.

Referring first to the instrument shown in Fig. 1, A and B represent two generator tubes or receptacles each partly filled with some suitable volatile liquid whose vapor pressure varies readily in response to changes of temperature. Sulfur dioxide is preferably used as it has an ideal pressure temperature relation for controlling humidity at variable temperatures. As the generator tubes are only partially filled with the liquid, each has an evaporating and a condensing surface, so that any change in temperature affecting the tube will produce an immediate corresponding change in the vapor pressure in the tube. The tubes, can, if desired, be corrugated or ribbed for enlarging their radiating surfaces to increase the rapidity of heat exchange and render them more sensitive.

Means are provided for enveloping one of the generator tubes with evaporating moisture so that the temperature of this tube always corresponds to that of the wet bulb thermometer and is lower than the temperature of the other tube B, which causes differential pressures in the vapor generated in the tubes. In the construction shown, the tube A is covered by a wick C which dips into a well $c$ to which water is supplied for wetting the wick by an inverted receptacle $c'$ whose discharge opening depends into the well so as to maintain the water at a constant level therein in a well known manner. Any other suitable means for causing the temperature of the generator tube A to correspond to that of the wet bulb thermometer could be employed.

D and E represent two diaphragms or motors of any suitable construction which are connected by pipes or passages $d$ and $e$ respectively, with the generating tubes A and B so that the diaphragms or motors will be subject to the respective pressures of the vapor generated in the tubes A and B to which they are connected. The motors D and E are arranged to operate in opposition to each other on a lever or device in such manner that unless the differential pressures of the motors on the lever or device bear a predetermined relation, the lever or device will be moved in one or another direction, depending upon whether the ratio of pressures increases or decreases. The lever or device controls means for regulating the humidity of air, and adjusting means are preferably provided for changing the ratio of the pressures of the motors on the lever or device for producing different regulating effects. In the construction shown in Fig. 1, the movable parts of the motors D and E bear against opposite sides of a lever F at different distances from its fulcrum, and a fulcrum block *f* for the lever is employed which is slidably mounted on a stationary supporting bar *f'* below the lever and is provided with a set screw *f²* for securing it in different positions on the bar. A weighted lever G is connected to the regulating lever to counterbalance the weight thereof.

H represents a valve of ordinary construction actuated by the regulating lever for admitting compressed air to and releasing it from means (not shown) operated by the air for altering the humidity of the air. The lever can be employed for controlling the humidity through the instrumentality of any device or devices capable of performing the desired results.

The vapor pressures in the motors D and E correspond respectively to the wet and dry bulb temperatures of the atmosphere, and it has been found that these pressures bear an almost exactly constant ratio for a given percentage of humidity for all temperatures between 50 degrees and 100 degrees F. so that a desired percentage of humidity can be secured by adjusting the fulcrum block *f* to give the necessary ratio between the pressures of the motors D and E acting on the lever, and no adjustment is required for variations in temperature between 50 degrees and 100 degrees. The lever F is preferably graduated and provided with characters indicating different percentages of humidity, and to obtain any desired percentage of humidity within the range of the instrument it is only necessary to set the fulcrum block opposite to the mark on the lever indicating this percentage. No other adjustment of the instrument is required.

I represents a thermostat with which the instrument is preferably equipped for controlling the temperature of the air in cold weather. It consists of a diaphragm or motor *i* connected by a pipe or passage *i'* to the generator tube B and operated by the vapor pressure produced therein, a spring *i²* which opposes the pressure of the motor I, and a valve *i³* which is actuated by the motor and controls the flow of compressed air to and from means (not shown) for governing the temperature. *i⁴* is an adjusting screw by which the tension of the spring *i²* can be changed for maintaining a desired temperature. The instrument can be provided with a thermostat or not, as desired, and a thermostat of any suitable construction operated by the vapor pressure can be used.

K and L represent ordinary wet and dry bulb thermometers which may be used or not, as preferred.

The several operative parts of the instrument in the construction shown are mounted on a base plate or board M of suitable insulating or non-conducting material provided with brackets *m* for securing it on a support, and are enclosed and protected by a cover hinged or otherwise movably connected to the base plate. The parts of the instrument could, however, be supported and protected in any other desired way.

With the vapor pressure acting differentially on the regulating device as above described, the instrument is adapted for maintaining a constant relative humidity of the air notwithstanding fluctations in the temperature thereof.

The particular construction above described is claimed in my said application No. 447,240, and is not claimed herein, but is shown and described to enable a clearer understanding of the instrument when constructed, as will now be described.

In Fig. 2 the instrument is constructed so that the vapor pressures produced by the wet and dry bulb temperatures act in direct opposition on the regulating device, thereby adapting the instrument to maintain a constant difference between the wet and dry bulb temperatures, which gives a varying relative humidity with fluctuations in temperature. In said Fig. 2, A' represents the vapor generating tube surrounded by the wetted wick C'; B' the other generating tube and D' and E' the diaphragms or motors connected respectively to the generating tubes A' and B'. The motors act in opposition on a regulating disk or device F' which slides in a slotted stationary tube *f³* and has a threaded engagement with an adjusting screw *f⁴* which has a threaded engagement of opposite pitch with a second disk *f⁵* also arranged to slide in the slotted tube *f³*. H' represents the valve for governing the flow of compressed air to and from the humidity controlling means (not shown).

A spring O arranged in the slotted tube *f³* opposes the movement of the regulating disk F' by the motor E', and the tension of this spring can be altered to obtain various constant differences between the wet and dry bulb temperatures by adjusting the screw *f⁴*.

So long as the pressure of the motor E' balances that of the other motor D' and spring O, the position of the valve H' will not be affected, but unbalanced pressures acting on the regulating device F' will effect a regulating action of the valve so as to maintain the desired constant difference between the wet and dry bulb temperatures of the air.

It will be noted that the spring O, which constitutes a motor or device for exerting power independently of the vapor-pressure-actuated diaphragms D' and E', acts on the valve H' in conjunction with the vapor pressure of the wet bulb generator A' and in opposition to the vapor pressure of the dry bulb generator B'. In other words, the vapor pressure of the dry bulb generator B' opposes both the vapor pressure of the wet bulb generator A' and also the pressure of the spring O, so that the regulator can be readily set, by adjusting the tension of the spring O, to operate in accordance with various differences between the wet and dry temperatures, and thereby give desired predetermined humidities at different temperatures.

I claim as my invention:

1. In a humidity regulator, the combination with a valve operable to control humidity; of thermoresponsive elements independently influenced by different temperatures, said elements being arranged and operating differentially due to changes in temperature affecting them to produce pressures acting in opposition to each other upon said valve, and a motor acting on said valve supplementarily with one of said thermoresponsive elements and in opposition to the other thermoresponsive element, whereby the operation of said valve is dependent upon the relation existing between said different temperatures.

2. In a humidity regulator, the combination with a valve operable to control humidity; of thermoresponsive elements independently influenced respectively by the wet and dry bulb temperatures of the air, said elements being arranged and operating differentially due to changes in temperature affecting them to produce yielding pressures acting in opposition to each other upon said valve, and a motor acting on said valve supplementarily to the pressure of said wet bulb thermoresponsive element and in opposition to the pressure of said dry bulb thermoresponsive element, whereby the operation of said valve is dependent upon the relation existing between said different temperatures.

3. In a humidity regulator, the combination with a valve operable to control humidity; of thermoresponsive elements independently influenced by the wet and dry bulb temperatures of the air, said elements being arranged and operating differentially due to changes in temperature affecting them to produce yielding pressures acting in opposition to each other upon said valve, and a spring acting on said valve supplementarily to one of said thermoresponsive elements and in opposition to the other thermoresponsive element, whereby the operation of said valve is dependent upon the relation existing between said different temperatures.

4. In a humidity regulator, the combination with a valve operable to control humidity, of vapor generators independently influenced by the wet and dry bulb temperatures of the air, and pressure actuated means for causing the different vapor pressures produced by said generators to act yieldingly in opposition upon said valve, and a motor acting on said valve supplementarily to the vapor pressure of said wet bulb generator and in opposition to the pressure of said dry bulb generator, whereby the operation of said valve is dependent upon the relation existing between said different temperatures.

5. In a humidity regulator, the combination with a valve operable to control humidity; of vapor generators independently influenced by the wet and dry bulb temperatures of the air, and pressure actuated means for causing the different vapor pressures produced by said generators to act yieldingly in opposition upon said valve, a motor acting on said valve supplementarily to the vapor pressure of said wet bulb generator and in opposition to the pressure of said dry bulb generator, whereby the operation of said valve is dependent upon the relation existing between said different temperatures, and means for varying the effect of said motor on said valve.

6. In a humidity regulator, the combination with a valve operable to control humidity; of vapor generators independently influenced by the wet and dry bulb temperatures of the air, and pressure actuated means for causing the different vapor pressures produced by said generators to act yieldingly in opposition upon upon said valve, a spring acting on said valve supplementarily to the vapor pressure of said wet bulb generator and in opposition to the pressure of said dry bulb generator, whereby the operation of said valve is dependent upon the relation existing between said different temperatures, and means for regulating the pressure of said spring.

7. In a humidity regulator, the combination with a valve operable to control the humidity; of a movable disk and connections for actuating said valve, vapor generators independently influenced by the wet and dry bulb temperatures of the air, fluid pressure motors connected to said generators and arranged to cause the different vapor pressures produced by said generators to act yieldingly in opposition upon said disk, a spring acting on said disk supplementarily to one of said motors and in opposition to said other motor, whereby the operation of said disk and valve is dependent upon the relation existing between said wet and dry bulb temperatures, and means for regulating the pressure of said spring.

WILLIS H. CARRIER.